(12) United States Patent
Johnson et al.

(10) Patent No.: US 8,798,961 B2
(45) Date of Patent: Aug. 5, 2014

(54) HIGH SPEED SPECTROMETER

(75) Inventors: Brady A. Johnson, Rossford, OH (US); Dmitriy Marinskiy, Tampa, FL (US)

(73) Assignee: First Solar, Inc., Perrysburg, OH (US)

( * ) Notice: Subject to any disclaimer, the term of this patent is extended or adjusted under 35 U.S.C. 154(b) by 378 days.

(21) Appl. No.: 13/221,491

(22) Filed: Aug. 30, 2011

(65) Prior Publication Data

US 2012/0053899 A1  Mar. 1, 2012

Related U.S. Application Data

(60) Provisional application No. 61/378,223, filed on Aug. 30, 2010.

(51) Int. Cl.
*G01J 1/00* (2006.01)
*G01J 1/08* (2006.01)

(52) U.S. Cl.
CPC ................................ *G01J 1/08* (2013.01)
USPC ............................ 702/182; 250/206

(58) Field of Classification Search
CPC ........................................... G01J 1/08
USPC ............................................. 702/182
See application file for complete search history.

(56) References Cited

U.S. PATENT DOCUMENTS 5,242,505 A * 9/1993 Lin et al. ................ 136/258
2010/0219327 A1   9/2010 Arbore et al.

FOREIGN PATENT DOCUMENTS

EP   1 278 049 A1   1/2003

OTHER PUBLICATIONS

Poruba, A., et al., "Fast quantum efficiency measurement and characterization of different thin film solar cells by Fourier transform photocurrent spectroscopy", Conf Record of 2006 IEEE 4th World Conf on Photovoltaic Energy Conversion, WCPEC-4, v. 2, May 7-12, 2006, pp. 1525-1527.
Hod'akova, L., et al., "Fast quantum efficiency measurement of solar cells by Fourier transform photocurrent spectroscopy", Journal of Non-Crystalline Solics, v. 352, n. 9-20 Spec. Iss., Jun. 15, 2006, pp. 1221-1224.
Ciocan, R., et al., "A fully automated system for local spectral characterization of photovoltaic structures", Conf Record of 35th IEEE Photovoltaic Specialists Conference, Jun. 10-25, 2010, PVSC 2010, pp. 1675-1677.
M. Vanecek et al., "Fourier-Transform Photocurrent Spectroscopy of Microcrystalline Silicon for Solar Cells," Applied Physics Letters, vol. 80, No. 5, pp. 719-721, Feb. 4, 2002.

* cited by examiner

*Primary Examiner* — Bryan Bui
(74) *Attorney, Agent, or Firm* — Dickstein Shapiro LLP

(57) ABSTRACT

A system for measuring quantum efficiency in a sample photovoltaic cell may include a Fourier transform infrared spectrometer. One or more light source for illuminating the photovoltaic cell in a wavelength range of interest are provided.

30 Claims, 3 Drawing Sheets

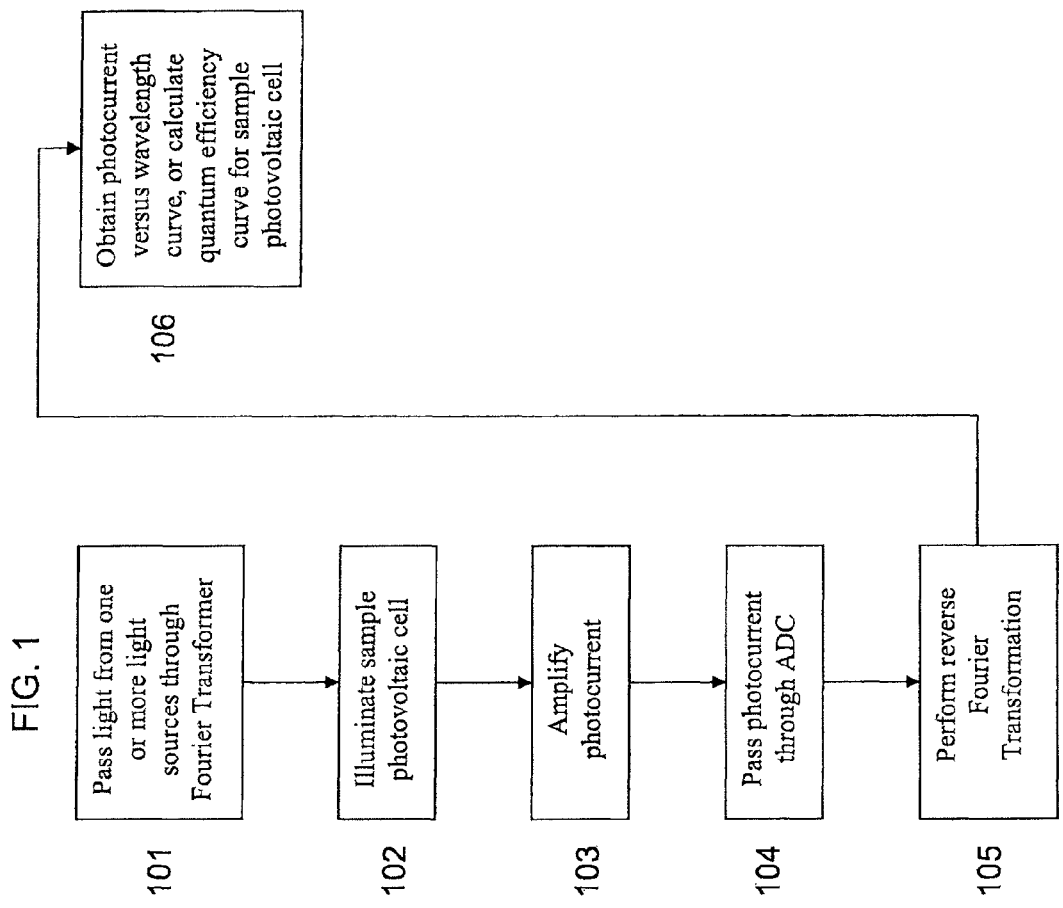

HIGH SPEED SPECTROMETER

CROSS-REFERENCE TO RELATED APPLICATIONS

This application claims priority to U.S. Provisional Application No. 61/378,223 filed on Aug. 30, 2010, the entirety of which is incorporated herein by reference.

FIELD OF THE INVENTION

The present invention relates to photovoltaic devices and methods of testing the same.

BACKGROUND OF THE INVENTION

Quantum efficiency measurements may be used to determine how much current a photovoltaic cell can produce under various light conditions. Existing methods of measuring the quantum efficiency of photovoltaic cells can be inefficient or incomplete.

BRIEF DESCRIPTION OF THE DRAWINGS

FIG. 1 is a flowchart of a method for measuring the quantum efficiency of a photovoltaic cell.

DETAILED DESCRIPTION OF THE INVENTION

Figure 2A:
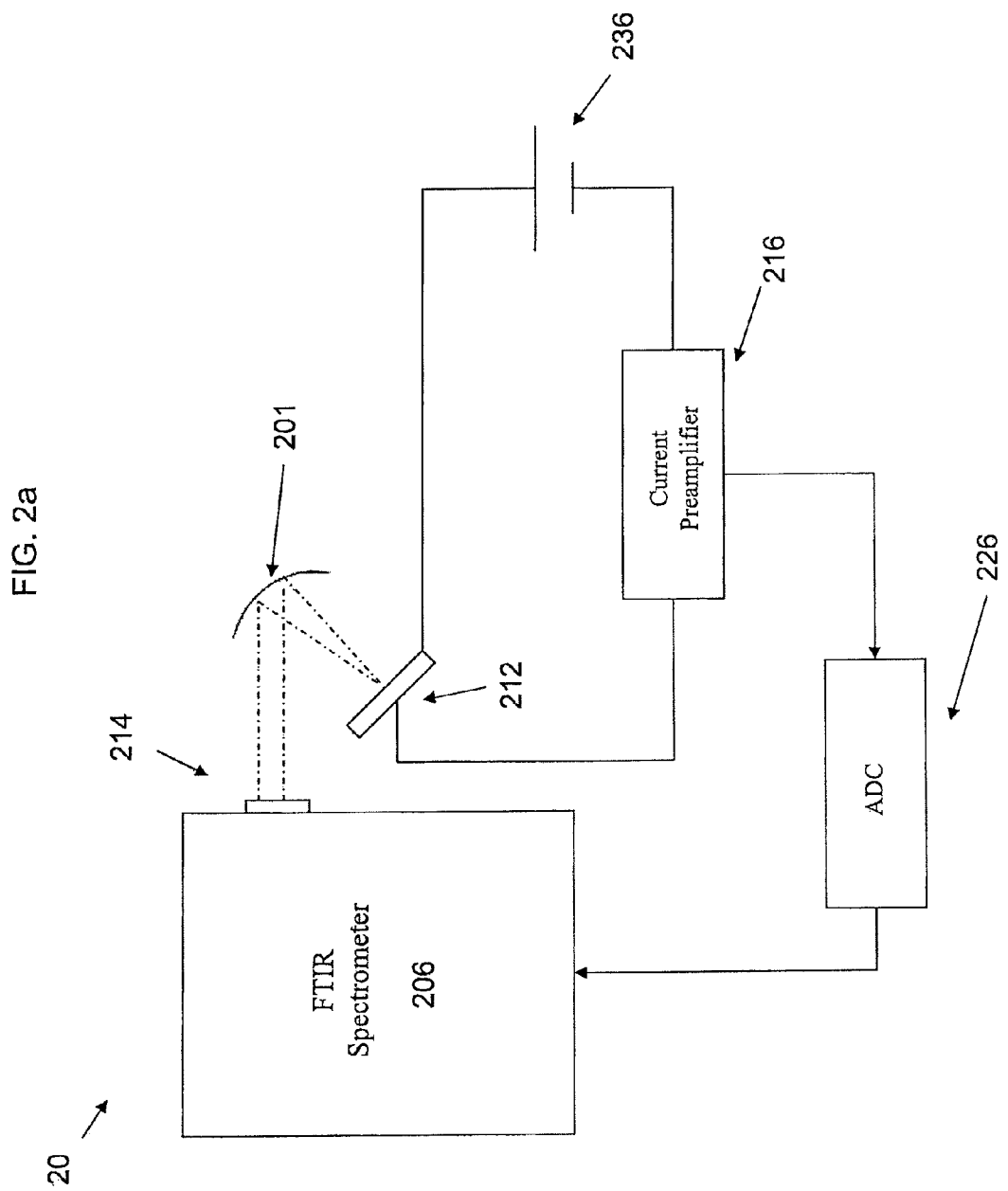
FIG. 2a is a schematic of a system for measuring the quantum efficiency of a photovoltaic cell.

Quantum efficiency spectra quantifies the current that a photovoltaic cell can produce in response to being illuminated by light having a particular wavelength. The device under test may be exposed to bias voltage created through additional light or applied externally in the form of a forward/reverse voltage bias to further quantify the amount of current a photovoltaic cell can generate under a biased condition. Quantum efficiency measurements may be taken by illuminating a sample photovoltaic cell with a specific wavelength of light, and measuring the generated current. For example, light from a white light source, such as a tungsten quartz halogen (TQH) or xenon arc (Xe-arc) bulb, may be passed through a monochromator.

Traditional systems for measuring quantum efficiency in photovoltaic cells suffer from various shortcomings, including, for example, slow measurement speed and limited wavelength resolution. For example, existing systems for cadmium telluride-based cells have yielded measuring times of about 30 seconds per scan, corresponding to a wavelength range of about 400 nm to about 900 nm, with a step size of about 10 nm. Wavelength resolution can be limited by the monochromator grid. For example, wavelength resolution is about 2 nm for state of the art quantum efficiency measuring systems. Even lower resolution between successive wavelength ranges being scanned (e.g., about 5 nm to 20 nm or greater) are typically required to achieve relatively slow scan times, for example about 30 seconds per scan. Further, with existing systems, under certain external bias conditions, the signal-to-noise ratio can become unacceptably small.

An improved quantum efficiency measurement system that addresses some or all of the shortcomings of existing systems may include a high speed spectrometer, for example, a Fourier transform infrared (FTIR) spectrometer. Such a system is capable of performing high-resolution scans at high speed. For example, a system of the present invention can perform scans with data spacing of about 15.428 cm$^{-1}$, 7.714 cm$^{-1}$, or 3.857 cm$^{-1}$, which respectively correspond to average resolutions of about 0.557 nm, 0.278 nm, and 0.139 nm in the wavelength range from 400 nm to 900 nm. A higher-resolution scan means less distance between successive wavelengths being scanned. Thus, a resolution of less than about 1 nm can be considered "high-resolution". Data spacing of about 15.428 cm$^{-1}$ is sufficient to acquire quantum efficiency of a typical cadmium telluride cell. Also a system of the present invention can provide high-speed scans. The scan speed may be determined by a variety of factors, including, for example, resolution, number of scans or repeats taken during a particular data acquisition cycle, and the optical velocity of the moving mirror. For example quantum efficiency measurements may take about 1.3 seconds or less, 2.6 seconds or less, or 5.6 seconds or less for a data spacing of 15.428 cm$^{-1}$, optical velocity of 0.9494, and number of scans of 4, 8, and 16 respectively. These speeds can be compared to about 30 seconds or more for conventional quantum efficiency measurement systems. Such a system may overcome the speed and wavelength resolution limitations of commercially available systems by passing white light through a Fourier transformer to allow for simultaneous illumination of the sample photovoltaic cell with all wavelength of the spectra. For example, an improved system may include an FTIR spectrometer proximate to a sample photovoltaic cell. The FTIR spectrometer can include any suitable commercial FTIR spectrometer, and thus may include one or more artificial light sources. The system may include a current preamplifier in connection with the sample photovoltaic cell for amplifying the photocurrent before further processing. The system may include an analog-to-digital converter (ADC) to convert the amplified current into a digital signal before passing back to the FTIR spectrometer for reverse Fourier transformation.

Using systems consistent with the aforementioned configurations, measurement speeds of 3 seconds per scan, or less, can be obtained, which constitutes a speed improvement over existing quantum efficiency measurement systems by a factor of 10 or more. Wavelength resolution may be limited by the data spacing of the Fourier transformer, and can have a wavelength resolution of approximately 0.002 nm in the wavelength range of 400 nm to 900 nm (or an improvement over existing systems by a factor of 1000 or more) for FTIR data spacing of 0.060 cm$^{-1}$. Typical FTIR data spacing required for accurate quantum efficiency measurements is 15.428 cm$^{-1}$ and still gives about 100 times improvement over existing systems. An improved system incorporating an FTIR spectrometer can thus result in improved measuring and performance characteristics, including, for example, an improved measurement speed by a factor of about 10 or more, and a wavelength resolution improvement by a factor of about 1000 or more.

A system for measuring quantum efficiency in a photovoltaic cell can include a photovoltaic cell, a high speed spectrometer, and one or more light sources for illuminating the photovoltaic cell in a wavelength range of interest. The system can include a photocurrent analyzer electrically connected to the photovoltaic cell to receive the current from the photovoltaic cell. The system can include a processor configured to perform reverse Fourier transformation to obtain current versus wavelength curve in the wavelength range of interest. The high speed spectrometer can include a Fourier Transform spectrometer. The photocurrent analyzer can include an amplifier for amplifying the photocurrent. The photocurrent analyzer can include an analog-to-digital converter for converting the photocurrent to a digital signal.

The one or more light sources may be optimized to provide sufficient illumination in the wavelength range of interest. It can include simultaneous illumination with a white light source and one or more blue light sources. The white light source can include a tungsten quartz halogen bulb. The one or more blue light sources can include one or more light emitting diodes. For example, a first blue light emitting diode can be configured to emit at a peak wavelength of about 405 nm. A second blue light emitting diode can be configured to emit at a peak wavelength of about 455 nm. The external light source can be configured to provide enough illumination intensity in the wavelength range of interest. For example, intensity of the white light source and the one or more blue light sources can be independently controlled. Two or more light sources can be combined by directing illumination of each light source onto a fiber optic bundle. Light emitted from another end of the fiber optic bundle can be collimated and directed as an input light for an FTIR spectrometer. In another approach, light from two or more light sources can be combined using an appropriate combination of mirrors/lenses (this eliminates fiber optic bundle). The system is capable of scanning the wavelength of 400 to 900 nm in less than 5.2 seconds, less than 2.6 seconds, or less than 1.3 seconds for data spacing of 15.428 cm$^{-1}$, optical mirror velocity of 0.9494, and number of scans of 16, 8, and 4 respectively.

The system can include an external voltage bias source electrically connected to the photovoltaic cell and configured to bias the photovoltaic cell. The system may include a light bias to bias the photovoltaic cell. The system can include an optical fiber configured to transmit light from the external light source/sources to the spectrometer. The system can include optical fiber configured to transmit light from the fourier spectrometer to the photovoltaic cell. The system can include a series of filters (bandpass, shortpass, or longpass) to optimize light from each of the external light sources.

In one aspect, a system for measuring quantum efficiency in a photovoltaic cell may include a photovoltaic cell. The system may include a Fourier transform infrared high speed spectrometer. The high speed spectrometer may include one or more light sources for illuminating the photovoltaic cell in at least two wavelength ranges. The system may include a photocurrent analyzer electrically connected to the photovoltaic cell by an electrical conductor and configured to receive a photocurrent corresponding to a wavelength range. The system may include a processor configured to analyze photocurrent in the wavelength range.

The wavelength range may correspond to a predetermined wavelength range of interest. The high speed spectrometer may include a Fourier transform infrared spectrometer. The processor may be configured to perform a Fourier transform to obtain a current versus wavelength curve for a wavelength range of interest. The photocurrent analyzer may include an amplifier for amplifying the photocurrent. The photocurrent analyzer may include an analog-to-digital converter for converting the photocurrent to a digital signal. The one or more light sources may include a white light source. The white light source may include a tungsten quartz halogen bulb. The system may include a secondary light source. The secondary light source may include a light emitting diode. The light emitting diode may include a blue light emitting diode. The secondary light source may be configured to emit light having a peak wavelength of about 405 nm. The system may include a tertiary light source. The tertiary light source may include a light emitting diode. The light emitting diode may include a blue light emitting diode. The tertiary light source may be configured to emit light having a peak wavelength of about 455 nm. The system may be capable of scanning a wavelength range from 400 nm to 900 nm in less than about 5.2 seconds. The system may be capable of scanning a wavelength range from 400 nm to 900 nm in less than about 2.6 seconds. The system may be capable of scanning a wavelength range from 400 nm to 900 nm in less than about 1.3 seconds. The processor may be configured to analyze photocurrent in the wavelength range using a predetermined data spacing of 15.428 cm$^{-1}$ corresponding to an average wavelength resolution of 0.557 nm in a wavelength range from 400 nm to 900 nm. The data spacing may be less than about 15.428 cm$^{-1}$ corresponding to an average wavelength resolution better than 0.557 nm in a wavelength range from 400 nm to 900 nm. The system may include an external voltage bias source electrically connected to the photovoltaic cell and configured to bias the photovoltaic cell. The system may include an optical fiber configured to transmit light from the one or more light sources to the high speed spectrometer.

In one aspect, a method for testing quantum efficiency in a photovoltaic cell may include performing a Fourier transform on a beam of light emitted from one or more light sources. The method may include directing the Fourier-transformed beam of light toward a photovoltaic cell to generate a photocurrent corresponding to the wavelength range. The method may include conducting the photocurrent from the photovoltaic cell to an analog-to-digital converter to produce a digital signal corresponding to the wavelength range. The method may include performing a reverse Fourier transform on the digital signal to obtain the photocurrent versus wavelength curve in the entire wavelength range.

The directing may include conducting the beam of light through an optical fiber. The directing may include redirecting the beam of light with a mirror. Acquiring photocurrent in the wavelength range from 400 nm to 900 nm may take less than about 5.2 seconds. The performing may include using a data spacing of 15.428 cm$^{-1}$ corresponding to an average wavelength resolution of about 0.557 nm in a wavelength range from 400 nm to 900 nm.

FIG. 1 contains a flowchart illustrating a method of obtaining quantum efficiency measurements using the aforementioned configurations. For example, at step 101, a light source may be directed through a Fourier transformer. The light source may include one or more sources. Any suitable light source may be used, including, any appropriate artificial light source. The artificial light source and Fourier transformer may be part of an FTIR spectrometer. The FTIR spectrometer may allow for simultaneous illumination of a sample photovoltaic cell with all wavelengths of light. The FTIR spectrometer may include any suitable light source, including, for example, any suitable tungsten quartz halogen (TQH) bulb or light emitter diode (LED). At step 102, light from the FTIR spectrometer may be redirected to a sample photovoltaic cell. The sample photovoltaic cell may include any suitable photovoltaic cell material, including, for example, cadmium telluride, silicon, copper-indium-gallium-selenium (CIGS), crystalline silicon, or amorphous silicon. At step 102, the redirected light may illuminate the sample photovoltaic cell to produce a photocurrent. At step 103, the photocurrent may be passed through a preamplifier. At step 104, the amplified photocurrent may be passed through an analog-to-digital converter (ADC) to obtain a digital signal for feeding back into the FTIR spectrometer. An external bias may also be applied through additional light or an externally applied forward/reverse voltage bias to further quantify the amount of current the sample photovoltaic cell can generate under a biased condition. At step 105, the photocurrent may be passed back through the Fourier transformer to be reversed Fourier transformed. At step 106, the measured data may be used to formulate a photocurrent versus wavelength curve, or to calculate a quantum efficiency curve for the sample photovoltaic cell.

A complete measurement cycle in the wavelength range from 400 to 900 nm with data spacing of 15.428 cm$^{-1}$, optical mirror speed of 0.9494, and number of scans of 4, 8, and 16 takes 1.3 seconds, 2.6 seconds, and 5.2 seconds respectively. The corresponding average wavelength resolution in the range from 400 to 900 nm is 0.557 nm. A quantum efficiency curve can help identify wavelengths or ranges of wavelengths at which the photovoltaic cell is most efficient, for example which wavelengths or ranges of wavelengths of light generate the greatest photocurrent for a given photovoltaic cell. This information can be used to compare the efficiency of multiple photovoltaic cell samples at a given wavelength or range of wavelengths or to access uniformity within one photovoltaic cell.

FIG. 2a depicts an exemplary system 20 for measuring quantum efficiency for a sample photovoltaic cell 212. System 20 may include a high speed spectrometer such as FTIR spectrometer 206. FTIR spectrometer 206 may include any suitable FTIR spectrometer, including, for example, any suitable commercial FTIR spectrometer. Light from an external light source can be directed as an input light for FTIR spectrometer 206 and may include an artificial light source. Any suitable artificial light source or combination of light sources may be used, including, for example, a tungsten quartz halogen bulb and one or more blue light emitting diodes. Because a TQH bulb may have insufficient light intensity in the blue spectrum (i.e., less than 450 nm), one or more blue light emitting diodes may be used to achieve simultaneous illumination of blue and white light. The external light source can include any suitable light source or combination of several light sources.

Figure 2B:
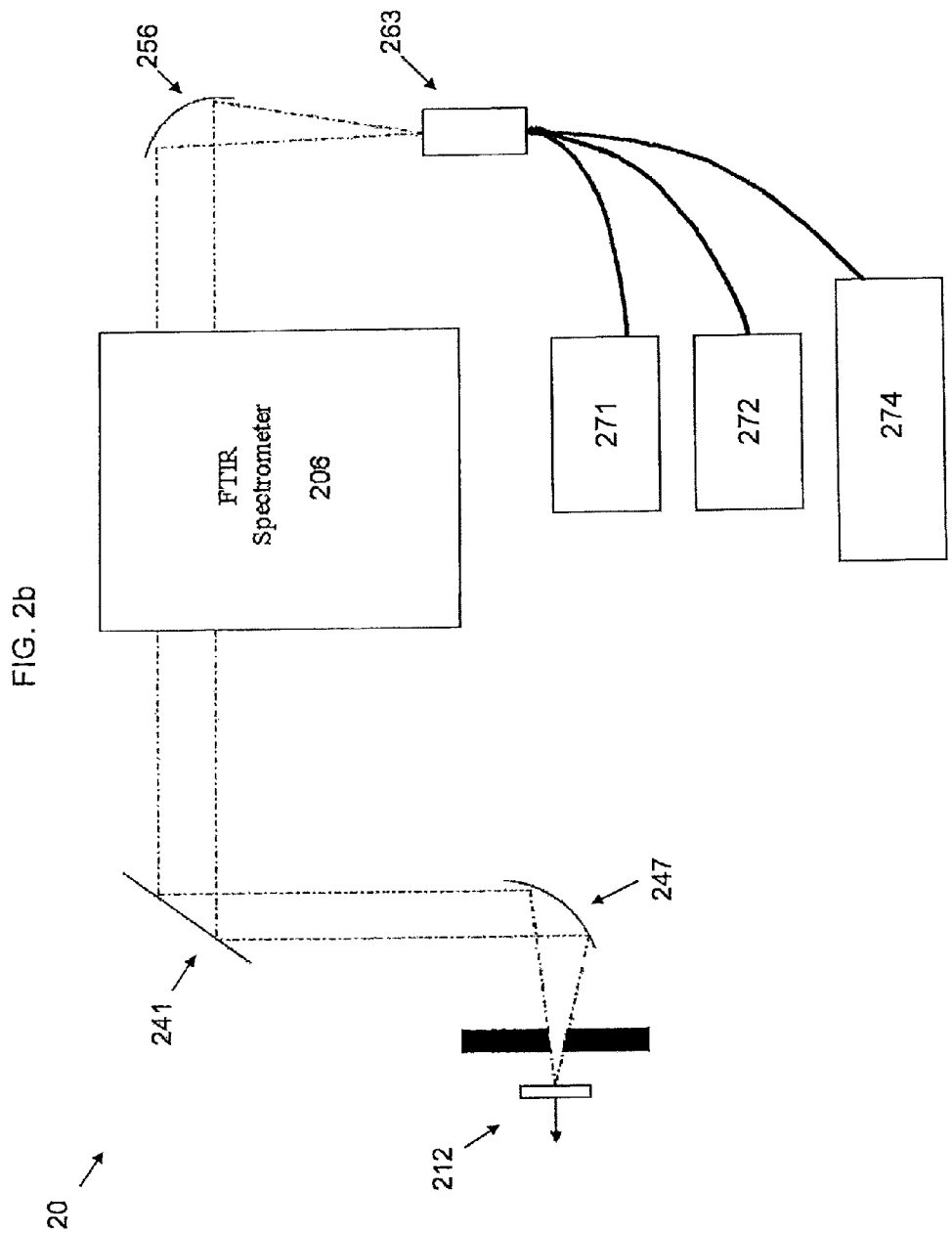
FIG. 2b is a schematic of a system for measuring the quantum efficiency of a photovoltaic cell.

Photovoltaic cell 212 can include any suitable photovoltaic device material, including, for example, cadmium telluride, silicon, or copper-indium-gallium-selenium (CIGS). Upon being illuminated, photovoltaic cell 212 can produce a photocurrent, which can be conducted to and/or fed through a photocurrent analyzer. The photocurrent analyzer can include any suitable component or combination of components suitable for processing the photocurrent. For example, the photocurrent analyzer can include an amplifier such as a current preamplifier 216. The photocurrent analyzer can include an analog-to-digital converter (ADC) to convert the analog (either amplified or not) photocurrent to a digital signal. The digital signal can then be passed back through a processor to compare the digital signal to the corresponding wavelength or range of wavelengths to which the photovoltaic cell was exposed, resulting in the photocurrent converted to the digital signal. The processor can include the FTIR spectrometer 206, which can perform the comparison by reverse Fourier transformation. System 20 may also include a bias source, including, for example, external bias voltage source 236 or an external light bias source. FIG. 2b depicts an alternative arrangement for system 20, in which two or three light sources, light emitting diodes (LEDs) 271, 272 and lamp 274 direct light to parabolic mirror 256 to provide an input for FTIR spectrometer 206. The illumination from light emitting diodes 271, 272 and lamp 274 may be combined and directed to FTIR spectrometer 206, for example, using a fiber optic bundle. Light emitting diodes 271, 272 may include any suitable LED, including, for example, one or more blue LEDs. Lamp 274 may include a tungsten quartz halogen bulb. Both light emitting diodes 271, 272 and lamp 274 may be coupled with focusing means for directing the light, including, for example, a collimating lens. The light can be passed through an optical fiber, and refocused before passing through FTIR spectrometer 206. The light output from FTIR spectrometer 206 can pass to mirror 241, where it can be redirected to parabolic mirror 247, where it can be directed to a focusing lens for illuminating photovoltaic cell 212. The generated photocurrent may be amplified and converted into a digital signal, consistent with the configuration in FIG. 2a.

The embodiments described above are offered by way of illustration and example. It should be understood that the examples provided above may be altered in certain respects and still remain within the scope of the claims. It should be appreciated that, while the invention has been described with reference to the above preferred embodiments, other embodiments are within the scope of the claims.

What is claimed as new and desired to be protected by Letters Patent of the United States is:

1. A system for measuring quantum efficiency in a photovoltaic cell, the system comprising:
    a photovoltaic cell;
    a Fourier transform infrared spectrometer comprising at least a white light source and a secondary light source for illuminating the photovoltaic cell;
    a photocurrent analyzer electrically connected to the photovoltaic cell by an electrical conductor and configured to receive a photocurrent corresponding to a wavelength range; and
    a processor configured to analyze photocurrent in the wavelength range.

2. The system of claim 1, wherein the wavelength range corresponds to a predetermined wavelength range of interest.

3. The system of claim 1, wherein the processor is configured to perform a Fourier transform to obtain a current versus wavelength curve for a wavelength range of interest.

4. The system of claim 1, wherein the photocurrent analyzer comprises an amplifier for amplifying the photocurrent.

5. The system of claim 1, wherein the photocurrent analyzer comprises an analog-to-digital converter for converting the photocurrent to a digital signal.

6. The system of claim 1, wherein the white light source comprises a tungsten quartz halogen bulb.

7. The system of claim 1, wherein the secondary light source comprises a light emitting diode.

8. The system of claim 7, wherein the light emitting diode comprises a blue light emitting diode.

9. The system of claim 1, wherein the secondary light source is configured to emit light having a peak wavelength of about 405 nm.

10. The system of claim 1, further comprising a tertiary light source.

11. The system of claim 10, wherein the tertiary light source comprises a light emitting diode.

12. The system of claim 11, wherein the light emitting diode comprises a blue light emitting diode.

13. The system of claim 10, wherein the tertiary light source is configured to emit light having a peak wavelength of about 455 nm.

14. The system of claim 1, wherein the system is capable of scanning a wavelength range from 400 nm to 900 nm in less than about 5.2 seconds.

15. The system of claim 14, wherein the system is capable of scanning a wavelength range from 400 nm to 900 nm in less than about 2.6 seconds.

16. The system of claim 15, wherein the system is capable of scanning a wavelength range from 400 nm to 900 nm in less than about 1.3 seconds.

17. The system of claim 1, wherein the processor is configured to analyze photocurrent in the wavelength range using a predetermined data spacing of 15.428 cm−1 corresponding to an average wavelength resolution of 0.557 nm in a wavelength range from 400 nm to 900 nm.

18. The system of claim 17, wherein acquiring photocurrent in the wavelength range from 400 nm to 900 nm takes less than about 5.2 seconds.

19. The system of claim 17, wherein the performing comprises using a predetermined data spacing of 15.428 cm−1 corresponding to an average wavelength resolution of about 0.557 nm in a wavelength range from 400 nm to 900 nm.

20. The system of claim 1, wherein the processor is configured to analyze photocurrent in the wavelength range using a predetermined data spacing less than 15.428 cm−1 corresponding to an average wavelength resolution better than 0.557 nm in a wavelength range from 400 nm to 900 nm.

21. The system of claim 1, further comprising an external voltage bias source electrically connected to the photovoltaic cell and configured to bias the photovoltaic cell.

22. The system of claim 1, further comprising an optical fiber configured to transmit light from the white light source and secondary light source to the high speed spectrometer.

23. The system as in claim 1, further comprising an external light source for biasing the photocell.

24. The system as in claim 1, wherein the light from the white light source and secondary light source are directed to the spectrometer by a fiber optic bundle.

25. The system as in claim 24, wherein light existing the fiber optic bundle is columnated.

26. The system as in claim 1, wherein light from the white light source and secondary light source in an optical path including mirrors and lenses.

27. The system as in claim 1, wherein the white light source and secondary light source are independently controllable.

28. A method for testing quantum efficiency in a photovoltaic cell, the method comprising:

performing a Fourier transform on beams of light emitted from a white light source and a secondary light source;

directing the Fourier-transformed beams of light toward a photovoltaic cell to generate a photocurrent corresponding to a wavelength range;

conducting the photocurrent from the photovoltaic cell to an analog-to-digital converter to produce a digital signal corresponding to the wavelength range; and performing a reverse Fourier transform on the digital signal to obtain the photocurrent versus wavelength curve in the entire wavelength range.

29. The method of claim 28, wherein the directing comprises conducting the Fourier-transformed beams of light through an optical fiber.

30. The method of claim 28, wherein the directing comprises redirecting the Fourier-transformed beams of light with a mirror.

* * * * *